(12) United States Patent
Hosseini et al.

(10) Patent No.: US 12,557,071 B2
(45) Date of Patent: Feb. 17, 2026

(54) BANDWIDTH (BW) ADAPTATION FOR POWER SAVING

(71) Applicant: QUALCOMM Incorporated, San Diego, CA (US)

(72) Inventors: Seyedkianoush Hosseini, San Diego, CA (US); Gabi Sarkis, San Diego, CA (US); Wanshi Chen, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 17/391,506

(22) Filed: Aug. 2, 2021

(65) Prior Publication Data
US 2023/0029974 A1 Feb. 2, 2023

(51) Int. Cl.
*H04W 72/12* (2023.01)
*H04L 5/00* (2006.01)
*H04W 28/26* (2009.01)
*H04W 72/02* (2009.01)
*H04W 72/04* (2023.01)
*H04W 72/0453* (2023.01)
*H04W 72/1263* (2023.01)
*H04W 72/20* (2023.01)

(52) U.S. Cl.
CPC .......... *H04W 72/02* (2013.01); *H04L 5/0094* (2013.01); *H04W 28/26* (2013.01); *H04W 72/0453* (2013.01); *H04W 72/1263* (2013.01); *H04W 72/20* (2023.01)

(58) Field of Classification Search
CPC ................ H04W 72/02; H04W 28/26; H04W 72/0453; H04W 72/20; H04W 72/40
See application file for complete search history.

(56) References Cited

U.S. PATENT DOCUMENTS

| | | | |
|---|---|---|---|
| 2017/0324524 A1* | 11/2017 | Zhou | H04L 5/0094 |
| 2018/0042023 A1* | 2/2018 | Sheng | H04W 4/40 |
| 2021/0306824 A1* | 9/2021 | Li | H04W 4/40 |
| 2022/0039158 A1* | 2/2022 | Awadin | H04W 74/0841 |
| 2022/0116913 A1 | 4/2022 | Hosseini et al. | |
| 2023/0189232 A1* | 6/2023 | Rastegardoost | H04L 5/0012 370/329 |
| 2023/0189325 A1* | 6/2023 | Su | H04W 72/25 370/329 |

* cited by examiner

Primary Examiner — Christopher M Crutchfield
Assistant Examiner — Aixa A Guadalupe Cruz
(74) Attorney, Agent, or Firm — Dinsmore & Shohl LLP

(57) ABSTRACT

Aspects of the present disclosure relate to wireless communications, and more particularly, to techniques for bandwidth adaptation. One example method by a user equipment (UE) includes selecting a first subband of multiple subbands of a bandwidth for communication on a sidelink channel, wherein each subband of the multiple subbands is associated with a configuration for the communication on the sidelink channel, the selection being based on the configuration associated with the first subband, and communicating on the sidelink channel using the first subband and in accordance with the configuration associated with the first subband.

25 Claims, 13 Drawing Sheets

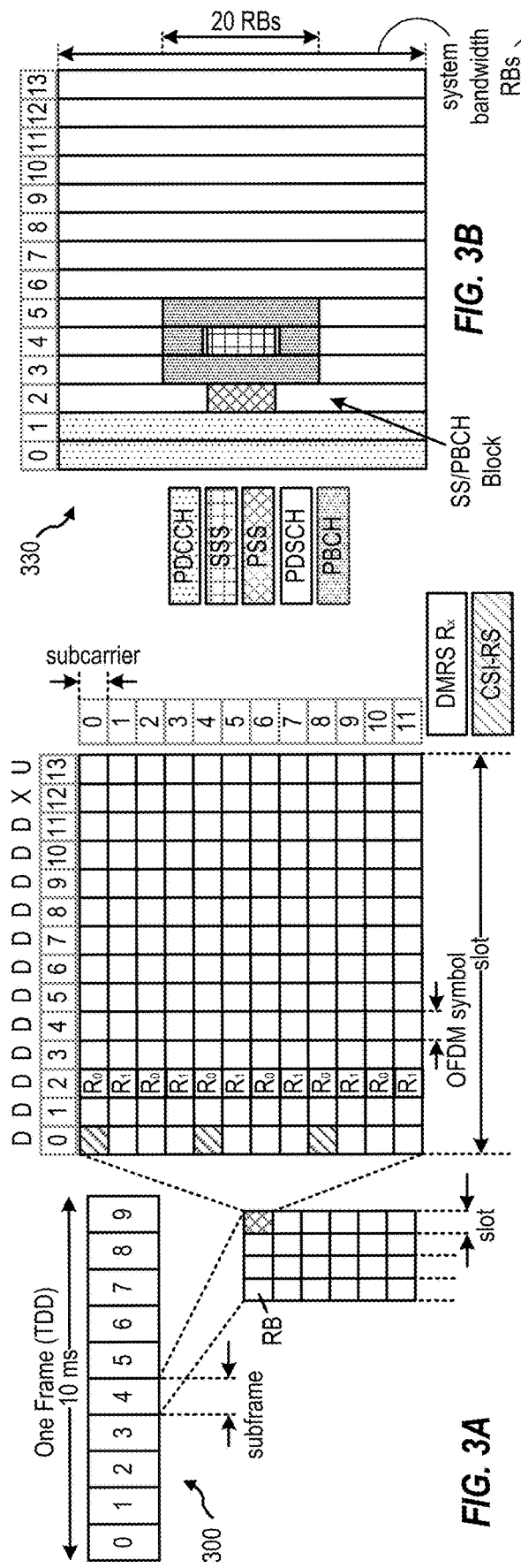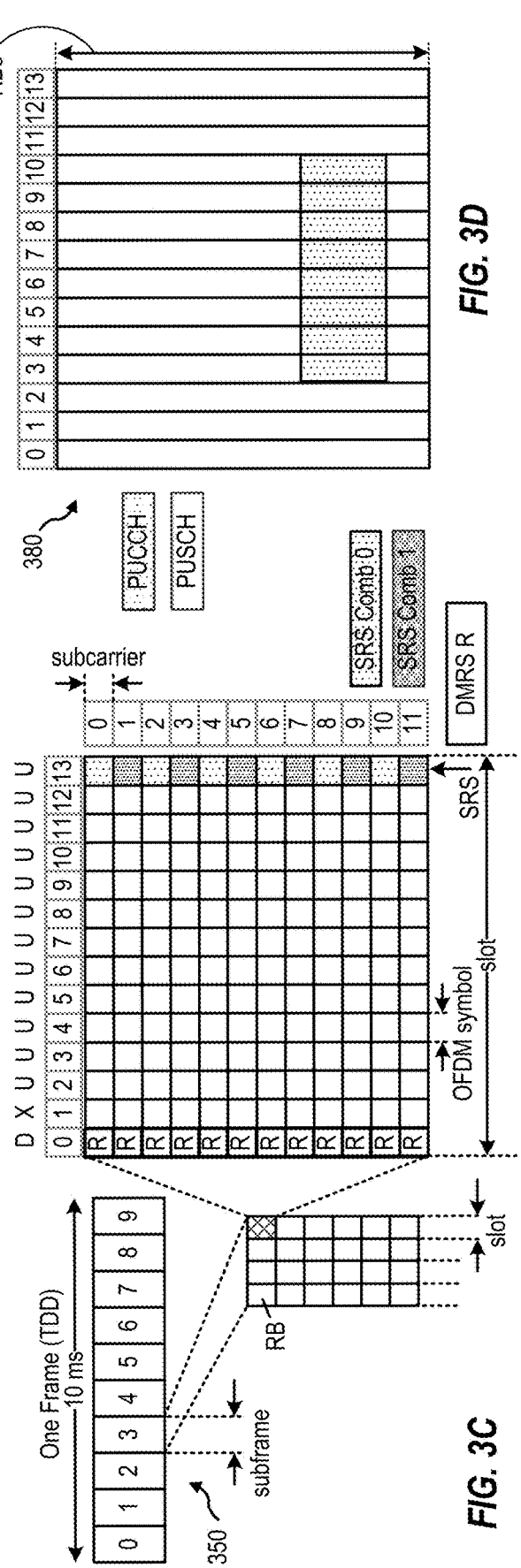

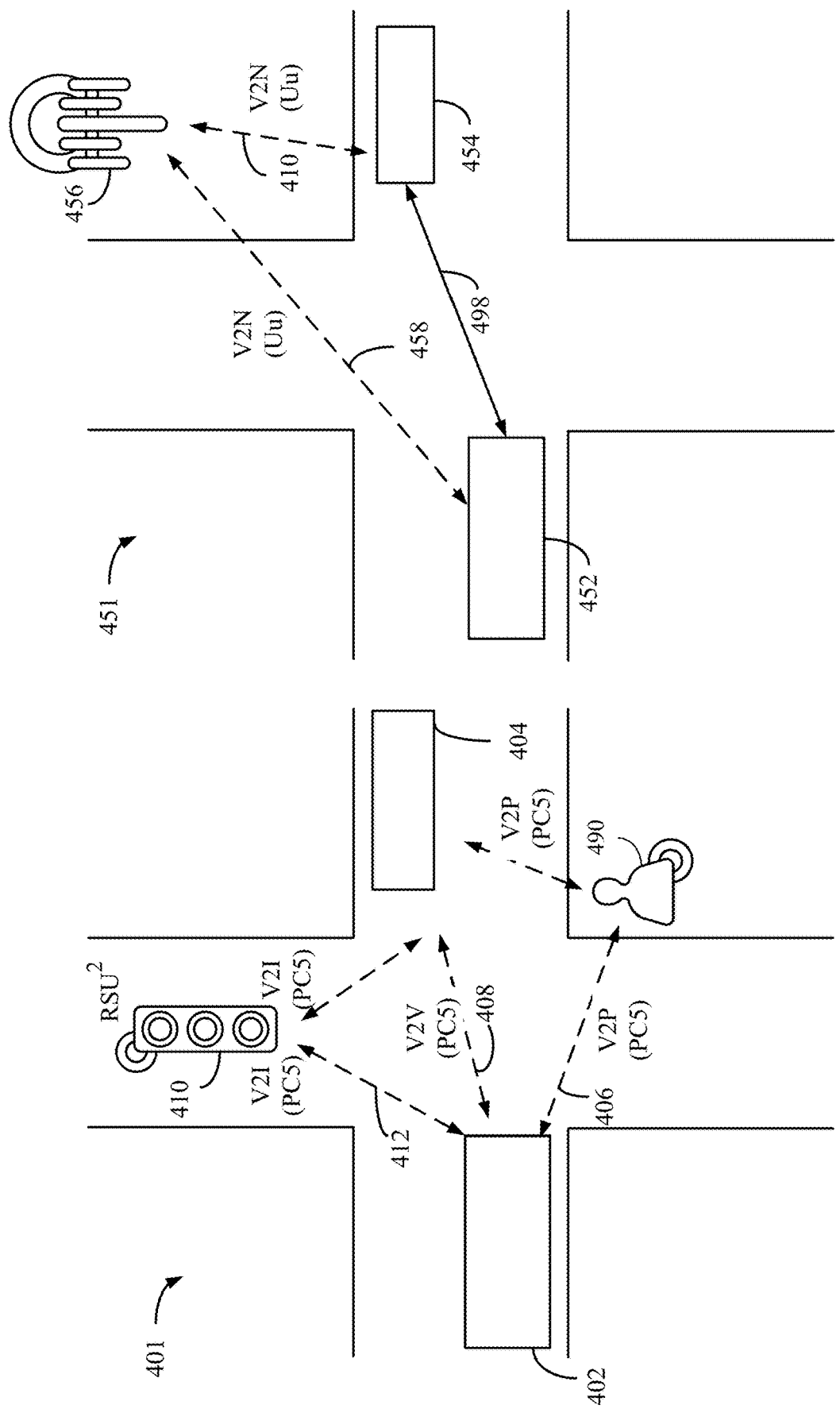

BANDWIDTH (BW) ADAPTATION FOR POWER SAVING

INTRODUCTION

Aspects of the present disclosure relate to wireless communications, and more particularly, to techniques for bandwidth adaptation.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Aspects of the present disclosure relate to wireless communications, and more particularly, to techniques for bandwidth adaptation.

Some aspects provide a method for wireless communication by a user equipment (UE). The method generally includes selecting a first subband of multiple subbands of a bandwidth for communication on a sidelink channel, wherein each subband of the multiple subbands is associated with a configuration for the communication on the sidelink channel, the selection being based on the configuration associated with the first subband; and communicating on the sidelink channel using the first subband and in accordance with the configuration associated with the first subband.

Some aspects provide a method for wireless communication by a wireless node. The method generally includes determining configurations associated with multiple subbands of a bandwidth for communication on a sidelink channel, wherein each of the configurations is associated with a respective one of the multiple subbands; and transmitting a message indicating the configurations to at least one UE.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIGS. 4A and 4B show diagrammatic representations of example vehicle to everything (V2X) systems in accordance with some aspects of the present disclosure.

DETAILED DESCRIPTION

Aspects of the present disclosure provide apparatuses, methods, processing systems, and computer-readable mediums for sequence selection for communicating on a sidelink channel. A resource pool may be allocated for sidelink communication by various user equipments (UEs). Some of the UEs may be reduced capability UEs that have power constraints. To save power for the reduced capability UEs, the reduced capability UEs may only monitor a subband of the resource pool, while other non-reduced capability UEs (e.g., regular capability UEs) monitor the entire resource pool. As a result, when performing sensing of a medium for resource reservation, a reduced capability UE may not sense a transmission from a non-reduced capability UE since the transmission is on a subband that is not monitored by the reduced capability UE. Thus, collisions may occur for transmissions of different UEs on a sidelink. Certain aspects of the present disclosure are directed to techniques for reducing collisions on sidelinks.

In certain aspects of the present disclosure, a resource pool may be partitioned into subbands (e.g., also referred to as bandwidth adaptation). In other words, a bandwidth may be adapted using partitions (e.g., subbands) that are configured for specific purposes. A specific configuration may be assigned to each subband, allowing UEs to select a subband to be used for communication by taking into account the specific configuration assigned for the subband. As an example, a specific resource allocation mode may be configured for each subband, such as full sensing, partial sensing, or random selection. As a result, a UE having a high priority packet to transmit may select a subband that is configured for full sensing since full sensing reduces the likelihood of a collision. As another example, each subband may be configured for a specific cast type (e.g., unicast, or broadcast). As a result, a UE using a specific application or service that uses a specific cast type can select the subband accordingly. The UE can select a subband for communication in a manner that reduces the chances of collision, saving UE power that would otherwise be wasted for retransmissions.

Introduction to Wireless Communication Networks

Figure 1:
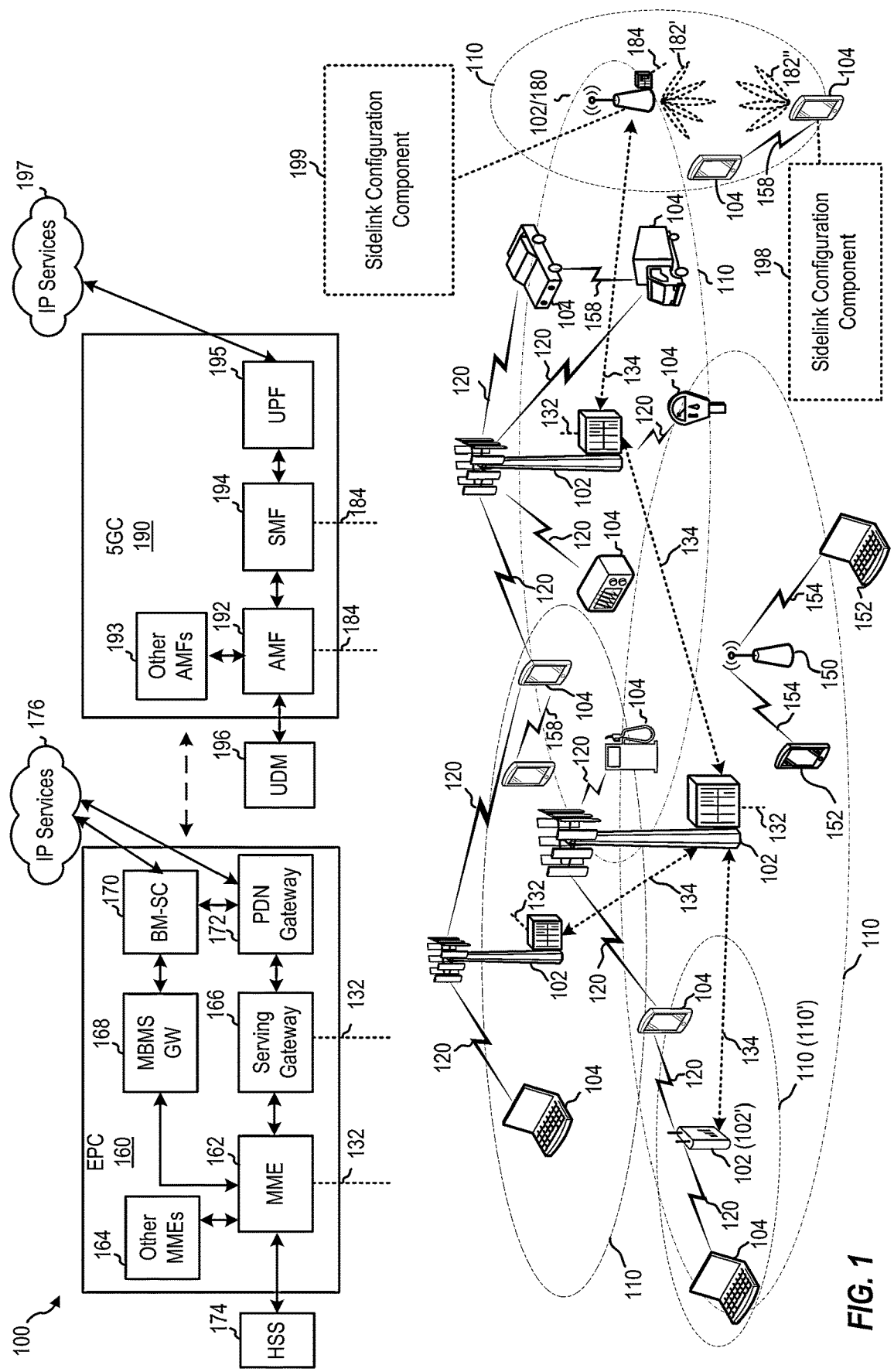
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes a sidelink configuration component 199, which may be configured to provide a configuration for each subband of a resource pool for sidelink communication. Wireless network 100 further includes a sidelink configuration component 198, which may be configured to select a subband of a resource pool for sidelink communication based on a configuration associated with the subband.

Figure 2:
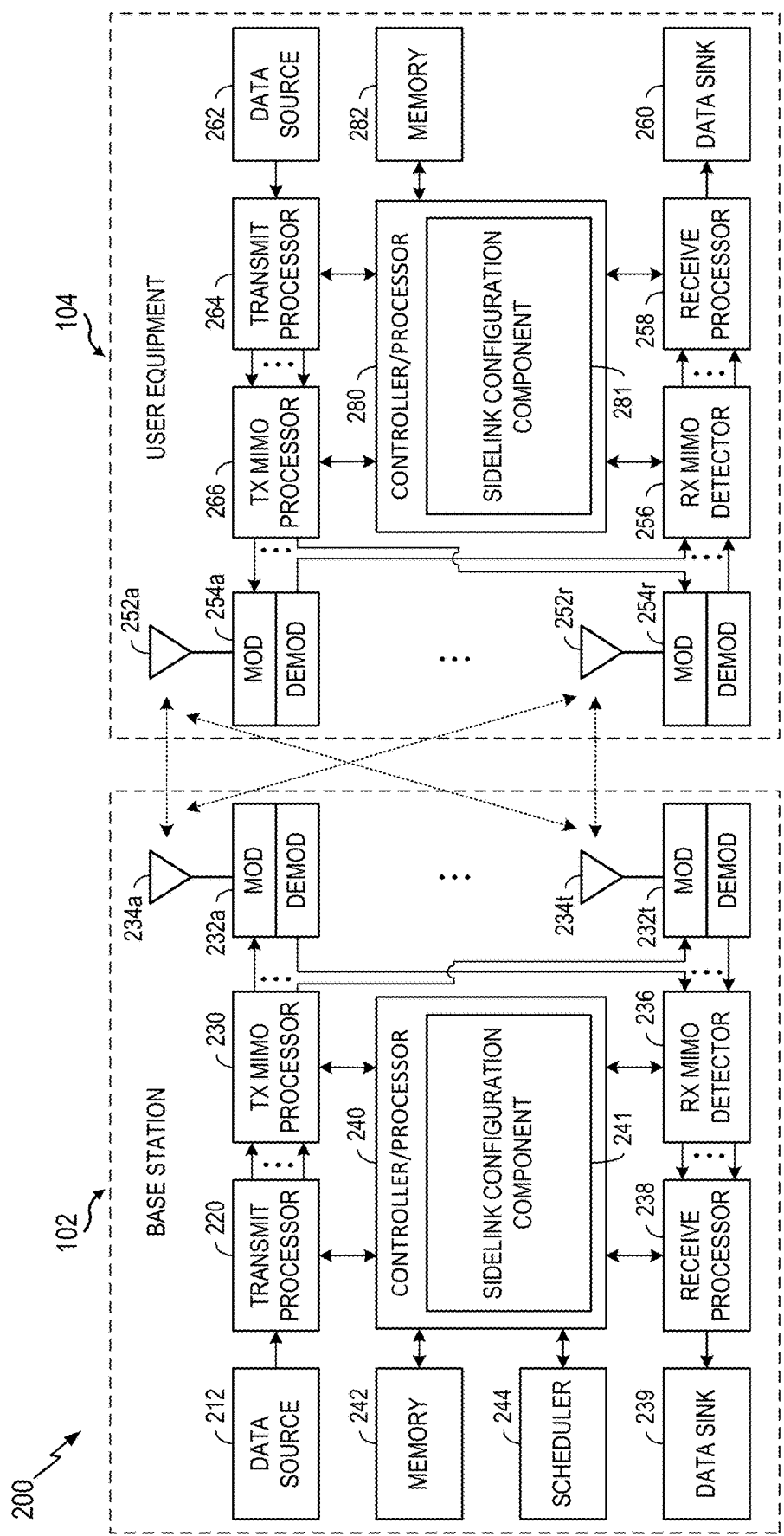
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes a sidelink configuration component 241, which may be representative of a sidelink configuration component 199 of FIG. 1. Notably, while depicted as an aspect of controller/processor 240, a sidelink configuration component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 104 includes controller/processor 280, which may be configured to implement various functions related to wireless communications. In the depicted example, controller/processor 280 includes a sidelink configuration component 281, which may be representative of a sidelink configuration component 198 of FIG. 1. Notably, while depicted as an aspect of controller/processor 280, a sidelink configuration component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to Sidelink Communications

FIGS. 4A and 4B depict example vehicle to everything (V2X) systems in accordance with some aspects of the present disclosure. For example, the UEs shown in FIGS. 4A and 4B may communicate via sidelink channels. While examples provided with respect to FIGS. 4A and 4B include V2X communication to facilitate understanding of sidelink, the aspects described herein are applicable to any sidelink communication between any types of UEs.

The V2X systems, provided in FIGS. 4A and 4B provide two sidelink operating modes. One sidelink operating mode, shown by way of example in FIG. 4A, involves direct communications (for example, also referred to as sidelink communications) between participants in proximity to one another in a local area.

Further in FIG. 4A, a V2X system 401 (for example, including vehicle to vehicle (V2V) communications) is illustrated with two UEs 402, 404 (e.g., vehicles). The first transmission mode allows for direct communication between different participants in a given geographic location. As illustrated, a vehicle can have a wireless communication link 406 with an individual 490 (V2P) (for example, via a UE) through an interface such as a PC5 interface. Communications between the UEs 402 and 404 may also occur through an interface 408 (e.g., a PC5 interface). In a like manner, communication may occur from a UE 402 to other highway components (for example, highway component 410), such as a traffic signal or sign (V2I) through an interface 412 (e.g., PC5 interface). With respect to each communication link illustrated in FIG. 4A, two-way communication may take place between wireless nodes, therefore each wireless node may be a transmitter and a receiver of information. The V2X system 401 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

Another sidelink operating mode, shown by way of example in FIG. 4B, involves communications through a network, which may be implemented over a Uu interface (for example, a wireless communication interface between a radio access network (RAN) and a UE). As illustrated, UEs 452, 454 may communicate with each other using a sidelink 498.

Specifically, FIG. 4B shows a V2X system 451 for communication between a UE 452 (e.g., vehicle) and a UE 454 (e.g., vehicle) through a network entity 456. These network communications may occur through discrete nodes, such as a base station (for example, an eNB or gNB), that sends and receives information to and from (for example, relays information between) UEs 452, 454. The network communications through vehicle to network (V2N) links (e.g., Uu links 458 and 410) may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. While FIGS. 4A and 4B describe techniques for sidelink communication by referring to vehicles, the aspects described herein are applicable to any UEs capable of sidelink communication.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Introduction to Reduced Capability Devices

In addition to regular capability devices, wireless communication may support reduced capability devices. Among others, examples of higher capability devices include premium smartphones, vehicle to everything (V2X) devices, ultra-reliable low latency communication (URLLC) devices, enhanced mobile broadband (eMBB) devices, etc. Reduced capability devices, on the other hand, may include wearables, industrial wireless sensor networks (IWSN), surveillance cameras, low-end smartphones, etc. For example, fifth-generation (5G) communication systems may support both higher capability devices and reduced capability devices. A reduced capability device may be referred to as an NR light device, a low-tier device, a lower-tier device, etc. Reduced capability UEs may communicate based on various types of wireless communication. For example, smart wearables may transmit or receive communication based on low power wide area (LPWA)/mMTC, relaxed internet of things (IoT) devices may transmit or receive communication based on URLLC, sensors/cameras may transmit or receive communication based on eMBB, etc.

In some examples, a reduced capability UE may have an uplink transmission power of at least 10 dB less than that of a regular capability UE. As another example, a reduced capability UE may have reduced transmission bandwidth or reception bandwidth compared to regular capability UEs. As a further example, a reduced capability UE may have a reduced number of reception antennas in comparison to regular capability UEs. For instance, a reduced capability UE may have only a single receive antenna and may experience a lower equivalent receive signal to noise ratio (SNR) in comparison to regular capability UEs that may have multiple antennas. Reduced capability UEs may also have reduced computational complexity than other UEs.

It may be helpful for communication to be scalable and deployable in a more efficient and cost-effective way. For example, it may be possible to relax or reduce peak throughput, latency, and/or reliability specifications for the reduced capability devices. In some examples, reductions in power consumption, complexity, production cost, and/or reductions in system overhead may be prioritized. In some safety-related applications, the latency of industrial wireless sensors may be acceptable up to 10 ms or up to 5 ms. The data rate may be lower and may include more uplink traffic than downlink traffic. As another example, video surveillance devices may have an acceptable latency of up to approximately 500 ms.

To facilitate scalable and deployable communications, multiple types of reduced capability devices may be introduced. For example, a reduced capability device for URLLC/eMBB may have more stringent specifications on peak throughput, latency, and reliability than a light reduced capability device, which may in turn have more stringent specifications than a superlight reduced capability device. On the other hand, a superlight reduced capability device may have improved coverage, complexity, and power consumption compared to a light reduced capability device, which may in turn have improved coverage, complexity, and power consumption compared to a reduced capability device for URLLC/eMBB.

Sidelink communication may use a set of time/frequency resources defined by a resource pool (e.g., a portion of a system bandwidth as described with respect to FIGS. 3A-3D). A wireless device (e.g., UE) may be configured by higher layers with one or more sidelink resource pools. A sidelink resource pool may be for transmission of a physical sidelink shared channel (PSSCH) or the reception of the PSSCH.

Introduction to Resource Allocation Modes for Sidelink

In some wireless communication systems, two resource allocation modes may be supported for sidelink communications. A sidelink resource pool may be associated with either of the two resource allocation modes. A sidelink resource pool may include a portion of a system bandwidth, as described with respect to FIGS. 3A-3D. Under the first resource allocation mode (resource allocation mode 1), the sidelink resources may be either indicated by a base station dynamically via downlink control information (DCI) format 3_0 or configured. Both Type 1 (configuration based) and Type 2 (activation based) sidelink resource configurations may be supported. Under the second mode (resource allocation mode 2), the UE may select its sidelink transmission resource(s) to be used by the UE for the sidelink transmission(s), e.g., without scheduling from the base station. A UE may determine the sidelink transmission resource(s) based on sensing and resource reservation. In some examples, the mode 2 resource allocation may be referred to as a sensing-based resource allocation for sidelink transmissions.

In the frequency domain, a sidelink resource pool may include a number (numSubchannel) of contiguous sub-channels. A sub-channel may include a number (subchannelsize) of contiguous physical resource blocks (PRBs). The number of contiguous sub-channels and the number of contiguous PRBs may be higher-layer parameters.

Figure 5:
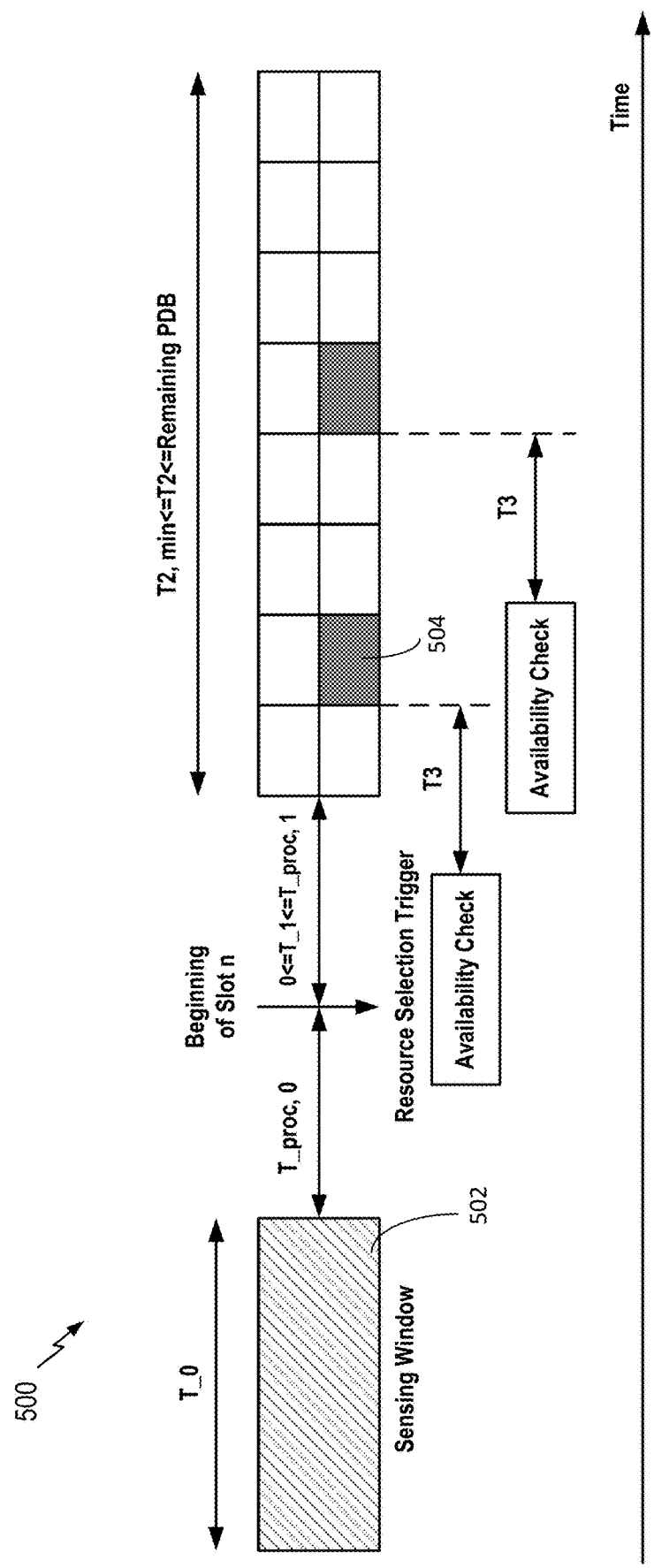
FIG. 5 illustrates example operations for resources allocation by sensing a medium.

FIG. 5 illustrates example operations 500 for resources allocation using resource allocation mode 2. A higher layer may request the UE 104 to determine a subset of resources from which the higher layer may select resources for physical sidelink shared channel (PSSCH)/physical sidelink control channel (PSCCH) transmissions.

To trigger resource selection at a slot n, the higher layer may provide a number of parameters including a t2min_SelectionWindow parameter. T2,min may be set to a corresponding value from the higher layer parameter t2min_SelectionWindow for a given value of $prio_{TX}$ that indicates configured priority $\{1, 5, 10, 20\} \cdot 2^\mu$ where $\mu$ may equal to 0, 1, 2, 3, for subcarrier spacing (SCS) 15, 30, 60, 120, kHz.

If T2,min is shorter than a remaining packet delay budget (PDB) (in slots), then $T_2$ may be determined by the UE 104 and T2,min may be less than or equal to $T_2$, which may be less than or equal to the remaining packet delay budget. If T2,min is not shorter than a remaining packet delay budget, resource selection window size $T_2$ may be set to the remaining packet delay budget. The higher layer may also indicate a parameter T_0 which indicates the sensing window size (e.g., a number of slots). The sensing window may be defined by a range of slots n−T_proc,0 (e.g., beginning of slot n minus a time duration T_proc,0, as shown). The UE may monitor slots which may belong to a sidelink resource pool within the sensing window except for those in which its own transmissions occur. The UE may decode the sidelink control information (SCI) received from other UEs during the sensing window. The UE may determine resources reserved via the SCIs. For example, a sensing UE may receive SCI during the sensing window 502 that is transmitted by another UE. The SCI during the sensing window may reserve resource 504 for transmission.

Each UE may attempt to reserve resources in the future that may collide with the resource selection window of the UE of interest. For example, the sensing UE (e.g., the UE of interest) may attempt to reserve resources during the resources 504. Based on a priority of the packet for which another UE is reserving a resource ($p_j$) (e.g., resource 504), the priority of the packet of the UE of interest ($p_i$), the configured reference signal received power (RSRP) for the ($p_i, p_j$) pair, and the measured RSRP by the UE of interest-based on the reception of PSCCH/PSSCH (e.g., including SCI) from the other UE, the UE of interest may determine whether a candidate resource (e.g., resource 504) is considered as available or not (i.e., considered as candidate resources for selection). In other words, the UE of interest may determine whether using the resource 504 may cause interference with the other UE.

Figure 6:
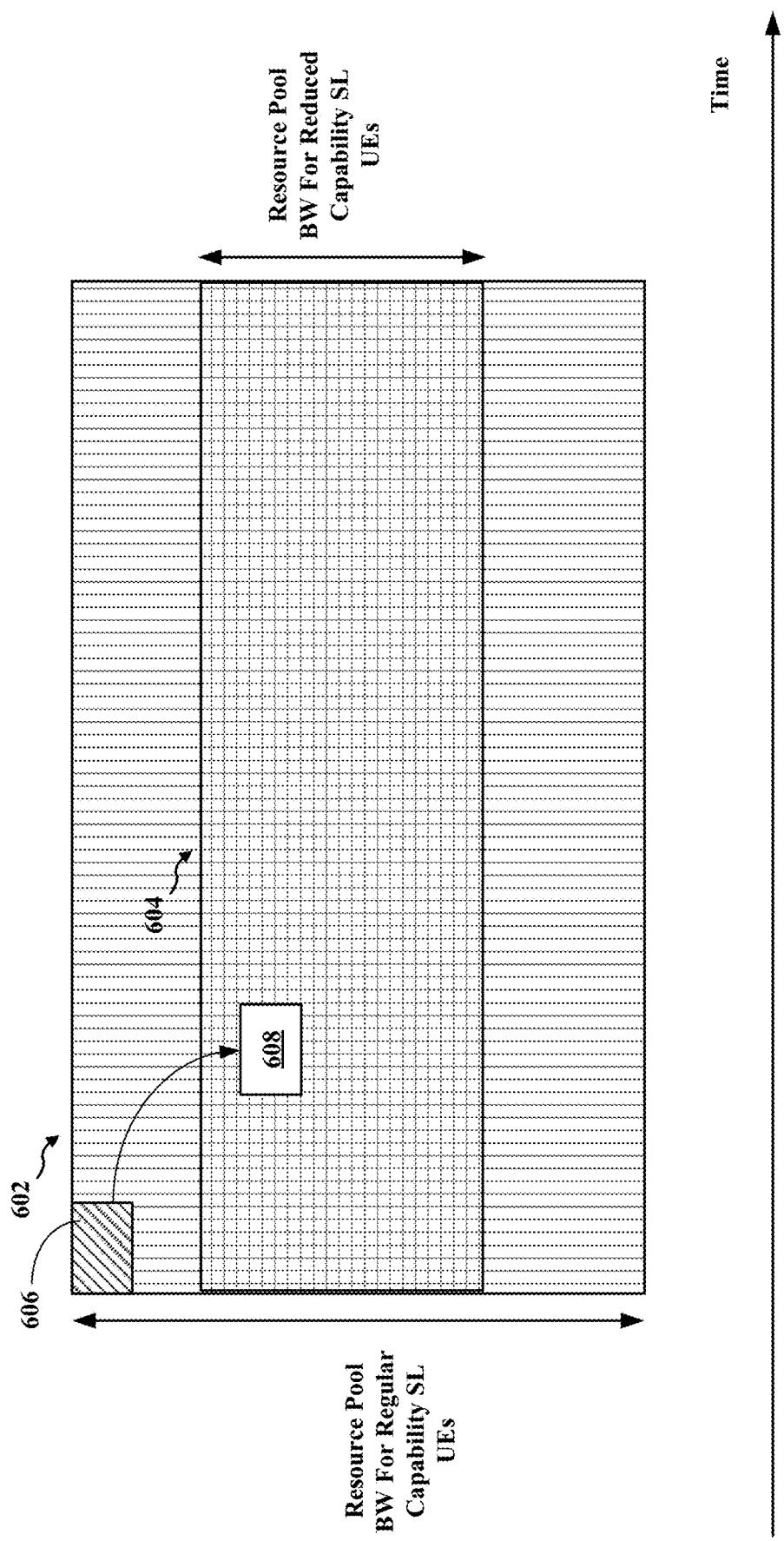
FIG. 6 illustrates example techniques for resource reservation.

FIG. 6 illustrates example techniques for resource reservations. A resource pool 602 for regular capability UEs (e.g., non-reduced capability UEs) may be overlapping with (e.g., encompassing) a resource pool 604 for reduced capability UEs. As described herein, reduced capability UEs may operate on a narrower bandwidth (e.g., resource pool 604), allowing the reduced capability UEs to operate with lower power consumption.

In some aspects, a reduced capability UE may operate in a fraction of the bandwidth of the resource pool 602. When a regular capability UE reserves a set of resources 608 in the resource pool 604 for reduced capability UEs via signaling 606 that is not part of the resource pool 604, the reduced capability UEs may not be able to sense the signaling 606 in order to consider the resource 608 when performing reservations. Therefore, collision (which may be power consuming for the reduced capability UEs as it may result in retransmissions) may occur. In addition, reservations made by reduced capability UEs may be detected by regular capability UEs since regular capability UEs are able to sense the entirety of the resource pool 602, which includes the resource pool 604 for reduced capability UEs.

Aspects Related to Bandwidth Adaptation

In some implementations, only a single bandwidth part (BWP) (e.g., a resource pool) may be available for sidelink. In some aspects of the present disclosure, a BWP may be partitioned into subbands that may be mapped to specific configurations, as described in more detail herein. A resource pool partitioned into subbands may be referred to as a segmented resource pool.

Having subbands with specific configurations known by UEs allows for a more efficient resource reservation process. On a given segmented resource pool, packets with different cast types may be transmitted. For example, a UE may transmit a packet in a unicast, connection-less groupcast, managed groupcast, or broadcast manner.

For connection-less groupcast and for broadcast, the transmitted packets may be received by an unknown set of UEs. For example, there is no PC5 link setup between the UEs for broadcast and connectionless groupcast. As a result, the set of subbands for transmission/reception cannot be modified over time when using connectionless groupcast or broadcast. For example, UEs in communication using unicast may negotiate using a particular subband (or multiple subbands) depending on an associated communication scenario. However, such a negotiation may not be possible for UEs communicating using connectionless groupcast or broadcast since the receiving UE(s) is unknown to the transmitting UE.

Connectionless groupcast generally refers to a transmission from a UE that may be received from one or more other UEs that are not in connected mode with the UE. Broadcast transmission is similar to connectionless groupcast, but with the connectionless groupcast being associated with a range. In other words, another UE may only decode a connectionless groupcast transmission if the other UE is within the given range associated with the transmission.

Figure 7:
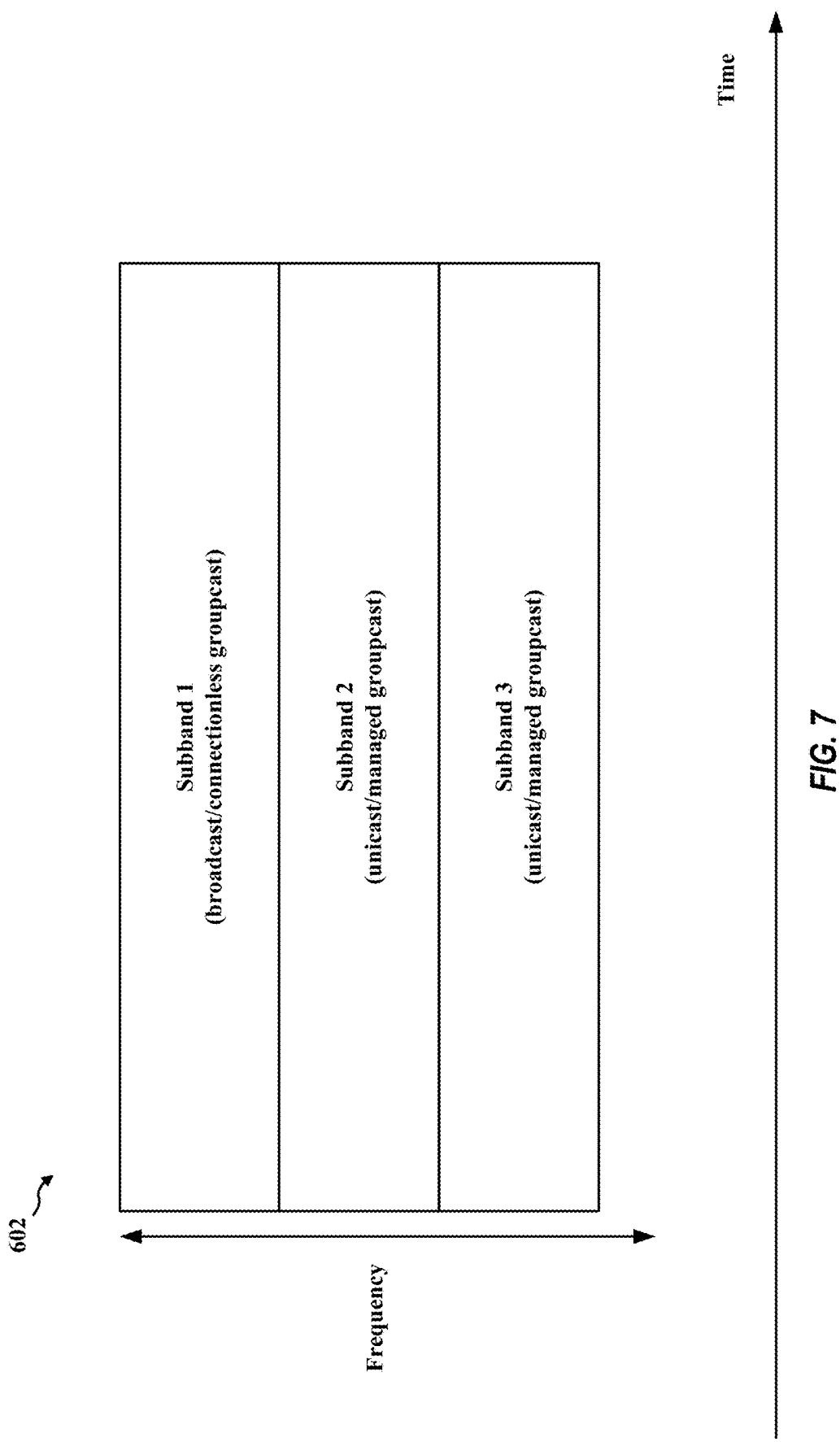
FIG. 7 illustrates a segmented resource pool, in accordance with certain aspects of the present disclosure.

FIG. 7 illustrates a segmented resource pool, in accordance with certain aspects of the present disclosure. In certain aspects, in a resource pool partitioned into multiple subbands, the cast type for subbands are configured (e.g., preconfigured). In the example shown in FIG. 7, the resource pool 602 (from FIG. 6) is partitioned into three subbands, labeled subband 1, subband 2, and subband 3. While three subbands are shown to facilitate understanding, any number of subbands greater than 1 may be used.

Some subbands (e.g., subband 1) may be configured to allow for broadcast or groupcast (e.g., specifically connection-less groupcast), while some subbands (e.g., subband 2 and subband 3) may be configured to allow for unicast or managed groupcast. One subband may be configured with a single cast type or multiple cast types. For example, subband 3 may be configured for only unicast.

For broadcast/connectionless groupcast, the selection of the subband to be used could be dependent on the application or service. For example, a specific application that uses broadcast communication may be assigned to a particular subband that is configured for broadcast. Thus, any UE using the specific application that uses broadcast may monitor the subband configured for broadcast.

As another example, the UEs operating in unicast or connection-based groupcast (also referred to as managed groupcast) may decide which subbands (e.g., subband 2) to be active on. Further, the UEs operating in unicast or connection-based groupcast may increase the number of subbands (e.g., operating bandwdith) or decrease the number of subbands used for communication. As an example, the UEs operating in unicast or connection-based groupcast may first communicate only on subband 2 configured for unicast or connection-based groupcast, then negotiate using both subband 2 and subband 3 to be able to communicate more data.

For further power saving, different resource allocation modes may be configured for different subbands. The different resource allocation modes may include a baseline mode (also referred to as fulling sensing mode), which involves a UE sensing all sidelink resources except when it is transmitting (e.g., due to a half-duplex (HD) limitation of some UEs that prevent sensing while transmitting). Another resource allocation mode may include partial sensing, which includes performing sensing only over a set of resources. For example, a UE may perform sensing for a few slots (e.g., 10 slots), and forgo sensing for a few slots (e.g., 20 slots). Another example resource allocation mode may include random selection wherein a UE selects resources without sensing. A resource pool may be configured to allow for multiple resource allocation modes.

Figure 8:
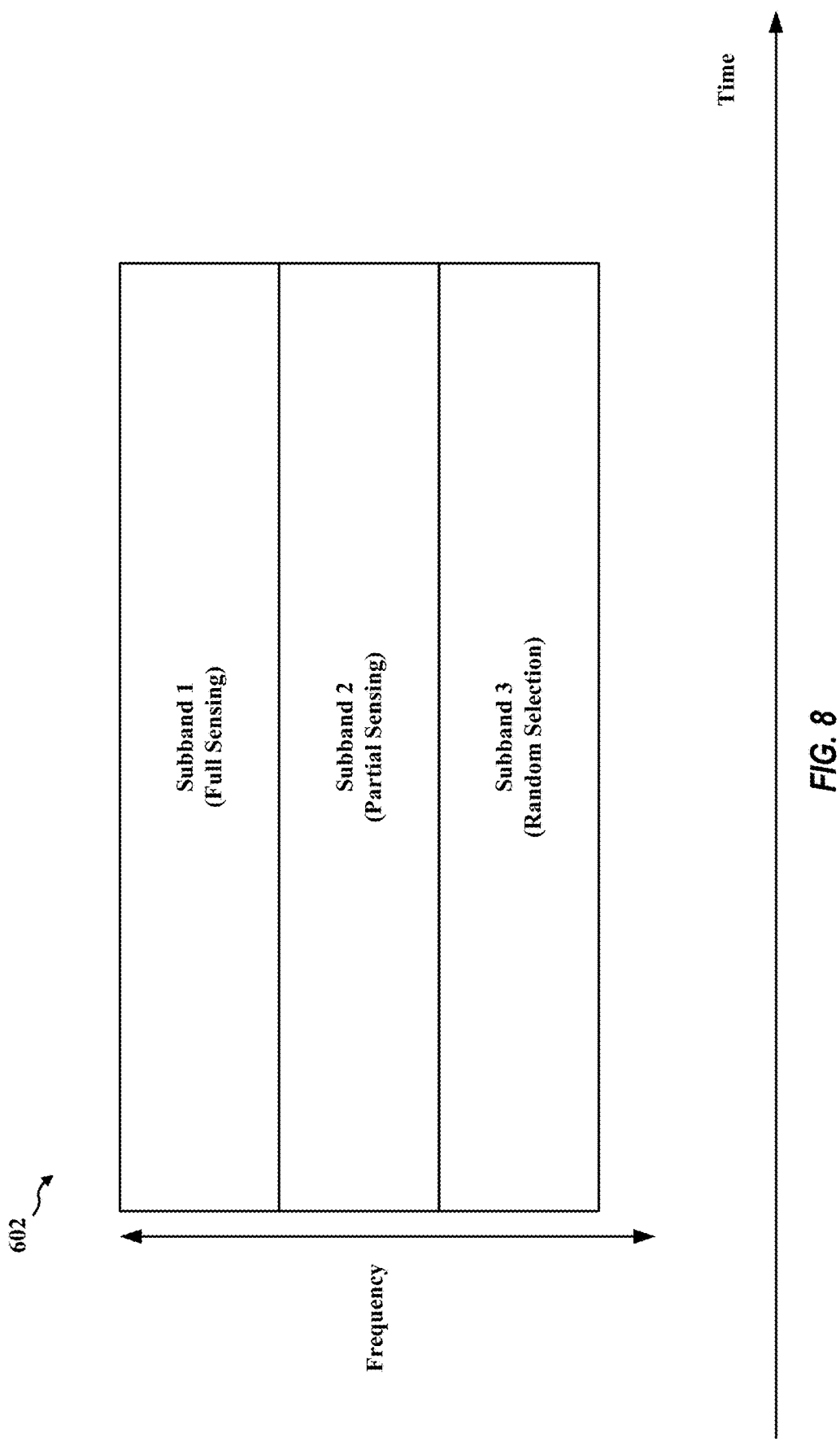
FIG. 8 illustrates a resource pool partitioned into subbands, each subband being configured with a resource allocation mode, in accordance with certain aspects of the present disclosure.

FIG. 8 illustrates a resource pool 602 (from FIG. 6) partitioned into subbands, each subband being configured with a resource allocation mode, in accordance with certain aspects of the present disclosure. For example, a subband may be configured for communication by UEs using full sensing, partial sensing, random selection or any combination thereof. As an example, subband 1 may be configured for communication by UEs using full sensing, subband 2 may be configured for communication by UEs using partial sensing, and subband 3 may be configured for communication by UEs using random selection. One subband may be configured for use with multiple resource allocation modes, such as full sending and partial sensing.

This approach provides improved multiplexing of UEs with different resource allocation modes. For example, a full sensing UE that is operating over the entire bandwidth may decide to choose resources from one or more subbands that are not assigned for UEs with random selection, thereby reducing the impact on the random selection UEs. This could also benefit the full sensing UEs as they can avoid collisions with the random selection UEs. In other words, since random selection UEs are not performing any sensing, transmitting using a subband assigned for communication by random selection may have an increased likelihood of collision compared to using a subband specifically assigned for communication by UEs use full sensing (or partial sensing). Therefore, when attempting to communicate a high priority packet, a UE may transmit the packet in a subband where other UEs perform sufficient sensing (e.g., using full or partial sensing).

As discussed, a reduced capability UE is detectable by regular capability UEs, allowing regular capability UE to determine their reservation strategy. As an example, a regular capability UE may make reservations only in the portion of the bandwidth (e.g., resource pool 604 described with respect to FIG. 6) sensed by the reduced capability UEs.

However, suppose the regular capability UE is making reservations from a portion of the bandwidth that is not observable by a reduced capability UE, as described with respect to FIG. 6. In that case, some considerations may be made such as reselection, and/or defining different priority thresholds or RSRP thresholds as to better protect the transmission of the reduced capability UEs. For example, each UE may indicate the monitored subbands (e.g., the subbands sensed by a UE) to other UEs. In other words, in a resource pool partitioned into a set of subbands, each UE may indicate the subband(s) that it is sensing. Thus, by each UE knowing what subband other UEs (e.g., reduced capability UEs) are sensing, the UE can make resource reservations accordingly. For example, a UE may know that a reduced capability UE is only sensing subband 2. Thus, the UE may determine to use subband 2 for transmitting SCI for resource reservation such that the reduced capability UE senses the SCI, in an attempt to reduce the likelihood of a collision.

In some aspects, a UE may transmit an indication of the subband being sensed by the UE using SCI (e.g., SCI-1 or SCI-2) or using medium access control (MAC)-control element (CE). A receiver UE, knowing the subband being sensed by other UEs, can determine its reservation strategy based on the indicated set of monitored subbands.

Figure 9:
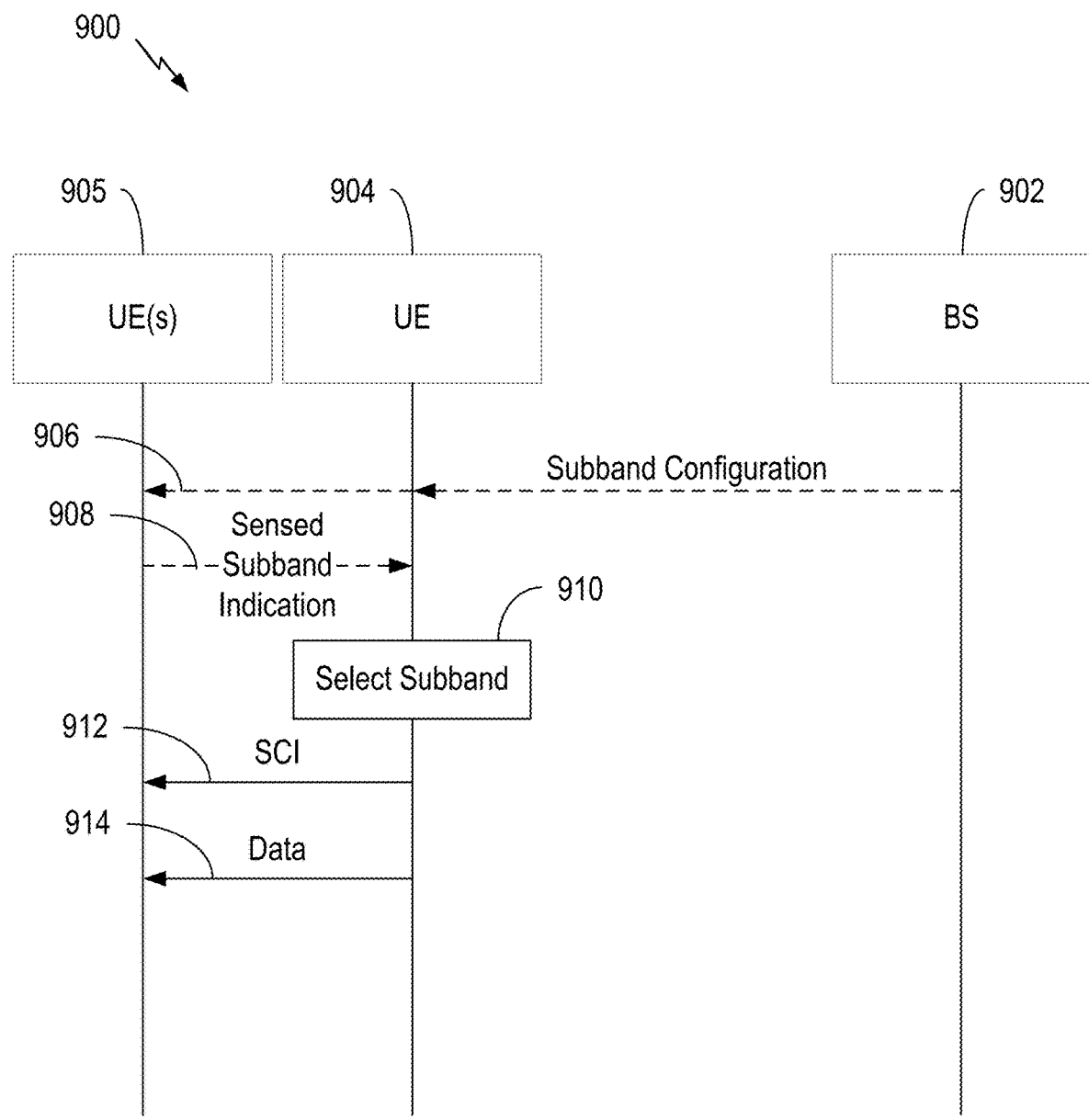
FIG. 9 is a call flow diagram illustrating example operations for sidelink communication, in accordance with certain aspects of the present disclosure.

FIG. 9 is a call flow diagram illustrating example operations 900 for sidelink communication, in accordance with certain aspects of the present disclosure. As shown, the BS 902 may transmit subband configurations 906 indicating a configuration for each subband of a resource pool (e.g., a bandwidth or BWP). As shown, the subband configurations 906 may be transmitted to UE 904 as well as one or more other UEs 905. In some aspects, the subband configurations may be preconfigured in a standard (e.g., instead of being configured by BS 902). The configurations may include a cast type (e.g., broadcast, connectionless groupcast, managed groupcast, or unicast) associated with each subband, or a resource reservation technique (e.g., resource allocation mode) to be used for each subband (e.g., whether full sensing, partial sensing, or random selection is to be used).

In some aspects, the one or more other UEs 905 may transmit (e.g., via SCI or MAC-CE) to UE 904 an indication 908 of a subband being sensed (e.g., monitored) by the UE(s) 905, as described herein. In some aspects, any one of UE 904 and UEs 905 may be a reduced capability UE. Based on the subband configurations and/or sensed subband indication 908, the UE may select a subband at block 910. The UE may then use the selected subband for communication with the one or more other UEs 905. For example, the UE may transmit an SCI 912 using the selected subband scheduling a data transmission 914.

Figure 10:
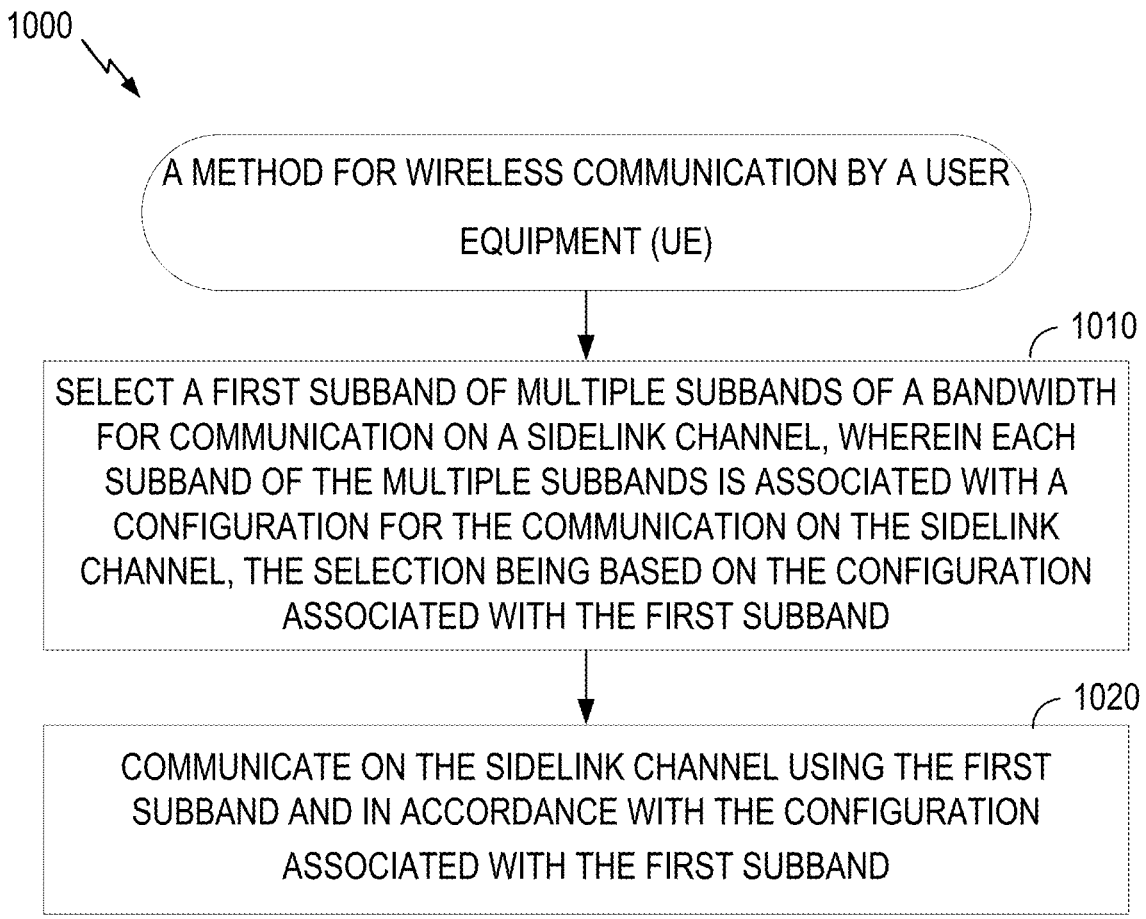
FIG. 10 is a flow diagram illustrating example operations for wireless communication by a user equipment, in accordance with certain aspects of the present disclosure.

FIG. 10 is a flow diagram illustrating example operations 1000 for wireless communication, in accordance with certain aspects of the present disclosure. The operations 1000 may be performed, for example, by a first wireless node, such as a UE (e.g., a UE 104 in the wireless communication network 100 of FIG. 1).

Operations 1000 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280 or sidelink configuration component 281 of FIG. 2) obtaining and/or outputting signals.

The operations 1000 begin, at block 1010, with the UE selecting a first subband of multiple subbands (e.g., subbands 1-3 as depicted in FIGS. 7-8) of a bandwidth (e.g., resource pool 602 of FIG. 6) for communication on a sidelink channel. Each subband of the multiple subbands may be associated with a configuration for the communication on the sidelink channel. The selection may be based on the configuration associated with the first subband. In some aspects, the UE may receive, from a wireless node (e.g., a base station), an indication of the configuration associated with each of the multiple subbands.

In some aspects, the configuration associated with each subband includes unicast, managed groupcast, connectionless groupcast, broadcast, or any combination thereof. The selection of the first subband may be based on whether an application or service uses the configuration associated with the first subband. For example, a particular application may use connectionless groupcast. As a result, the UE may select a subband (e.g., the first subband) for communication that is configured for connectionless groupcast.

In some aspects, the configuration associated with each subband includes at least one resource allocation mode (e.g., full sensing, partial sensing, or random selection) to be used for reserving resources for communication on the subband. As an example, each of the at least one resource allocation mode may include a configuration of whether resource reservation is to be carried out by sensing a medium for the communication on the subband. The UE may select a subband that is configured to full sensing if the communication by the UE has a high priority since using the subband configured for full sensing may be more reliable than using another subband that uses random selection or partial sensing.

In some aspects, the UE may receive, from each of one or more other UEs, an indication of a second subband (e.g., the same or different as the selected first subband) of the multiple subbands being sensed by the other UE. The selection of the first subband may be based on the indication of the second subband being sensed by the other UE. The indication may be received via sidelink control information (SCI) or medium access control (MAC) control element (CE).

At block 1020, the UE may communicate (e.g., transmit or receive) on the sidelink channel using the first subband and in accordance with the configuration associated with the first subband. The communication using the first subband may include communication of control information (e.g., via SCI) reserving resources for communication on one of the multiple subbands.

Figure 11:
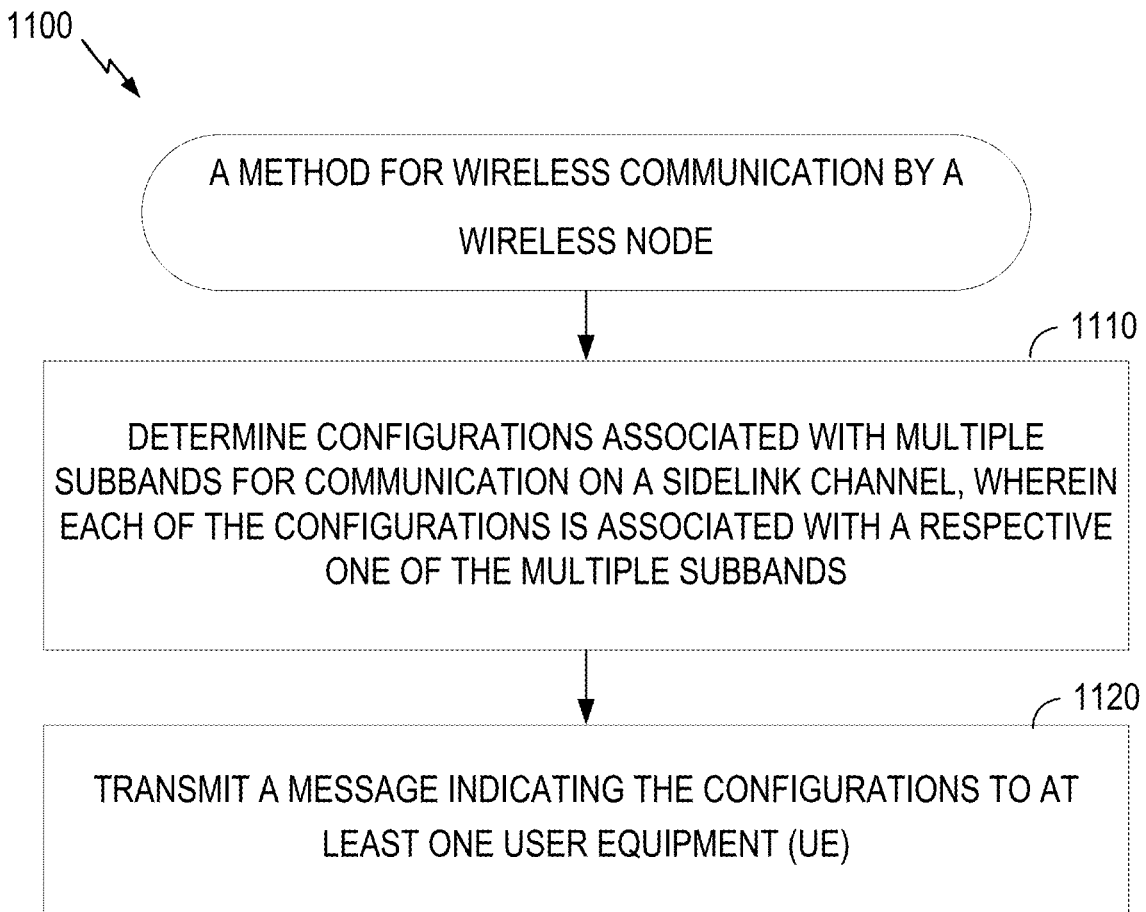
FIG. 11 is a flow diagram illustrating example operations for wireless communication by a wireless node such as a base station, in accordance with certain aspects of the present disclosure.

FIG. 11 is a flow diagram illustrating example operations 1100 for wireless communication, in accordance with certain aspects of the present disclosure. The operations 1100 may be performed, for example, by a wireless node, such as a BS (e.g., such as the BS 102 in the wireless communication network 100 of FIG. 1).

Operations 1100 may be implemented as software components that are executed and run on one or more processors (e.g., controller/processor 240 of FIG. 2). Further, the transmission and reception of signals by the BS in operations 1100 may be enabled, for example, by one or more antennas (e.g., antennas 234 of FIG. 2). In certain aspects, the transmission and/or reception of signals by the BS may be implemented via a bus interface of one or more processors (e.g., controller/processor 240 or sidelink configuration component 241 of FIG. 2) obtaining and/or outputting signals.

The operations 1100 begin, at block 1110, with the wireless node determining configurations associated with multiple subbands for communication on a sidelink channel.

Each of the configurations may be associated with a respective one of the multiple subbands. Each of the configurations may include unicast, managed groupcast, connectionless groupcast, broadcast, or any combination thereof. In some aspects, each of the configurations includes at least one resource allocation mode to be used for reserving resources for communication on the respective one of the multiple subbands. For example, each of the at least one resource allocation mode includes a configuration of whether resource reservation is to be carried out by sensing a medium for the communication on the respective one of the multiple subbands.

At block 1120, the wireless node transmitting a message indicating the configurations to at least one user equipment (UE).

Example Wireless Communication Devices

Figure 12:
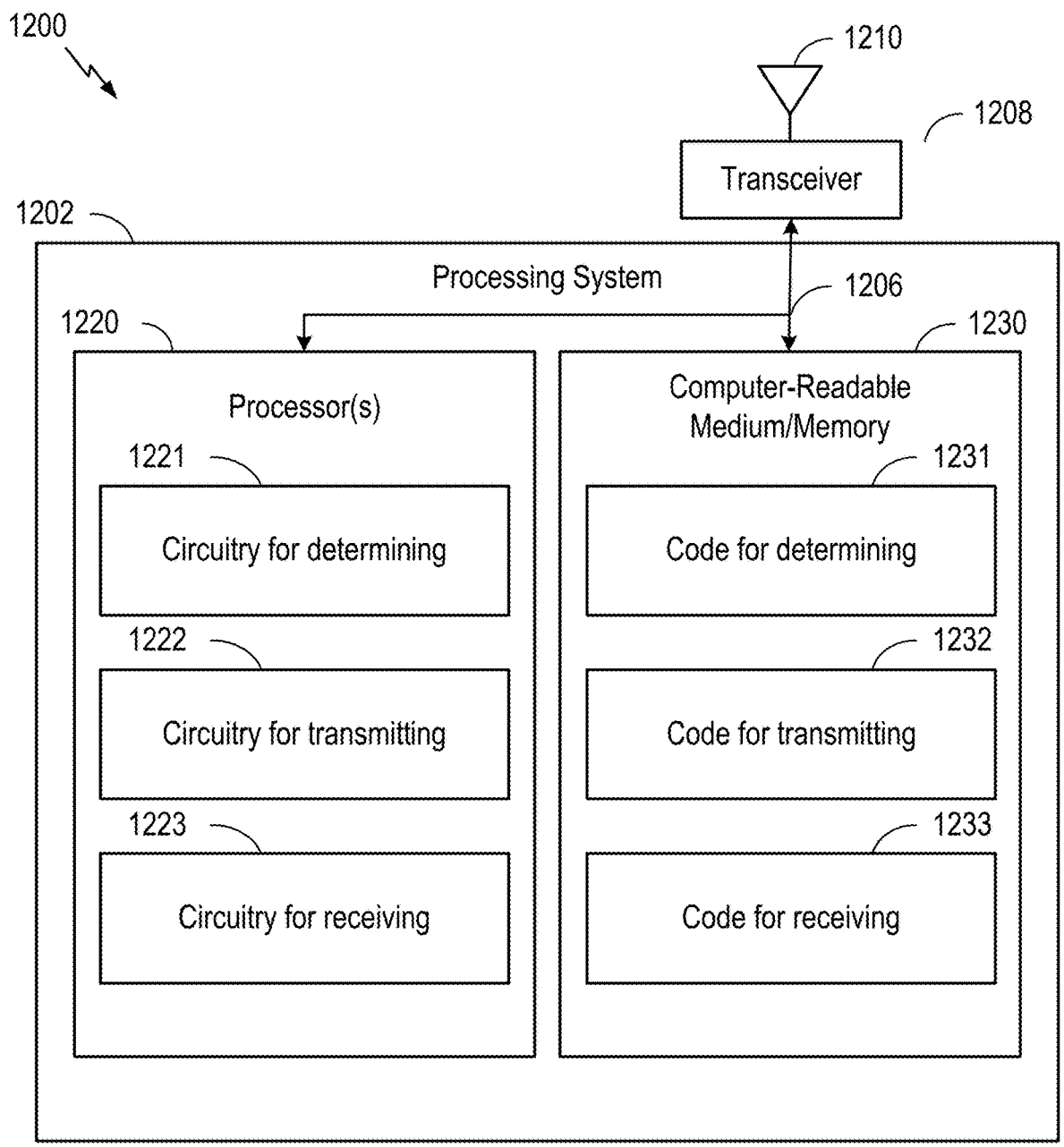
FIG. 12 depicts aspects of an example communications device.

FIG. 12 depicts an example communications device 1200 that includes various components operable, configured, or adapted to perform operations for the techniques disclosed herein, such as the operations depicted and described with respect to FIGS. 9 and 11. In some examples, communication device 1200 may be a base station 102 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIGS. 9 and 11, or other operations for performing the various techniques discussed herein for providing a configuration for each subband of a resource pool for sidelink communication.

In the depicted example, computer-readable medium/memory 1230 stores code 1231 for determining, code 1232 for transmitting, and code 1233 for receiving.

In the depicted example, the one or more processors 1220 include circuitry configured to implement the code stored in the computer-readable medium/memory 1230, including circuitry 1221 for determining, circuitry 1222 for transmitting, and circuitry 1223 for receiving.

Various components of communications device 1200 may provide means for performing the methods described herein, including with respect to FIGS. 9 and 11.

In some examples, means for transmitting or sending (or means for outputting for transmission) may include the transceivers 232 and/or antenna(s) 234 of the base station 102 illustrated in FIG. 2 and/or transceiver 1208 and antenna 1210 of the communication device 1200 in FIG. 12.

In some examples, means for receiving (or means for obtaining) may include the transceivers 232 and/or antenna(s) 234 of the base station illustrated in FIG. 2 and/or transceiver 1208 and antenna 1210 of the communication device 1200 in FIG. 12.

In some examples, means for determining, means for transmitting, and means for receiving may include various processing system components, such as: the one or more processors 1220 in FIG. 12, or aspects of the base station 102 depicted in FIG. 2, including receive processor 238, transmit processor 220, TX MIMO processor 230, and/or controller/processor 240 (including a sidelink configuration component 241).

Notably, FIG. 12 is just one example, and many other examples and configurations of communication device 1200 are possible.

Figure 13:
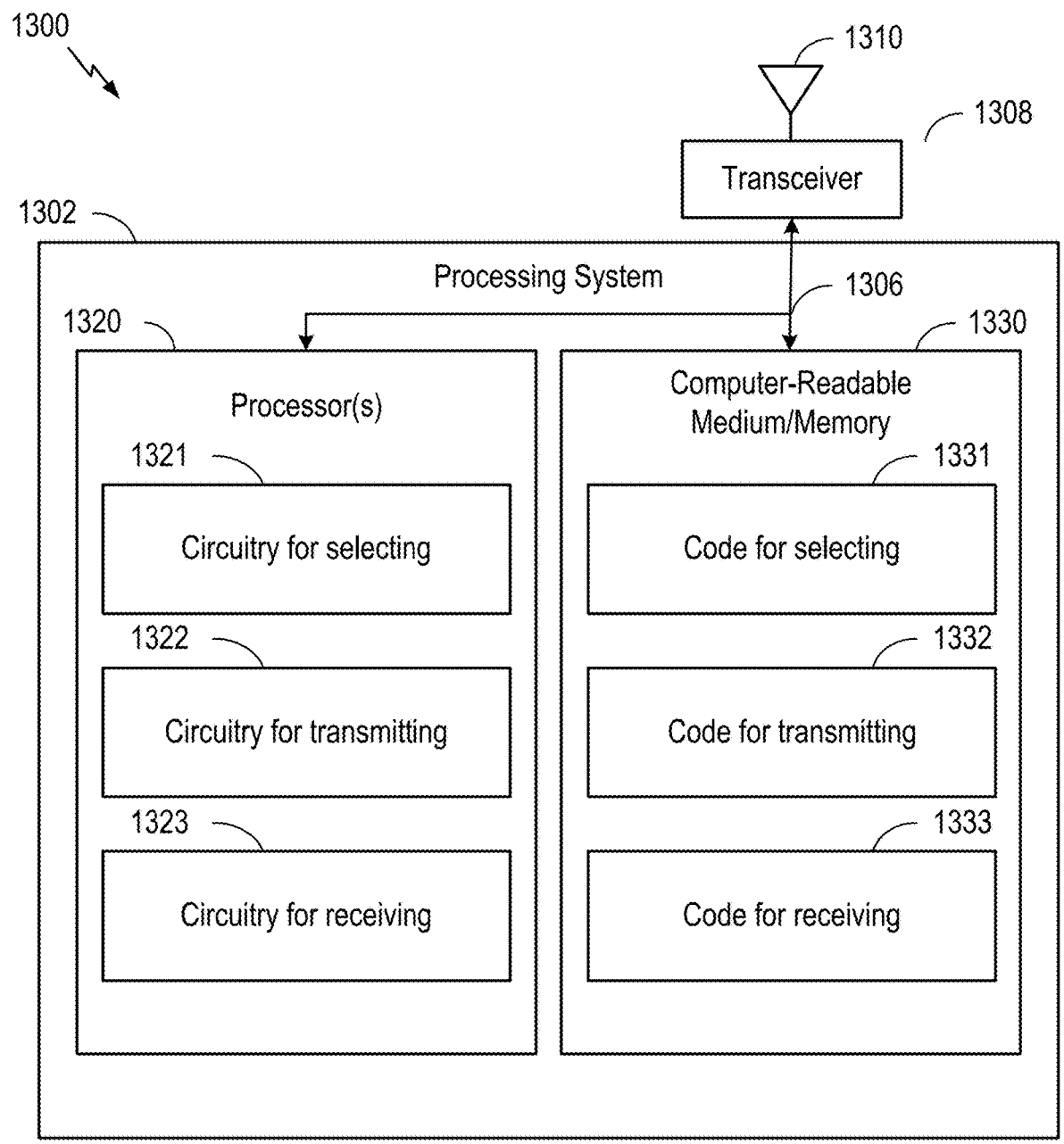
FIG. 13 depicts aspects of another example communications device.

FIG. 13 depicts an example communications device 1300 that includes various components operable, configured, or adapted to perform operations for the techniques disclosed herein, such as the operations depicted and described with respect to FIGS. 9 and 10. In some examples, communication device 1300 may be a user equipment 104 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIGS. 9 and 10, or other operations for performing the various techniques discussed herein for select a subband of a resource pool for sidelink communication based on a configuration associated with the subband.

In the depicted example, computer-readable medium/memory 1330 stores code 1331 for selecting, code 1332 for transmitting, and code 1333 for receiving.

In the depicted example, the one or more processors 1320 include circuitry configured to implement the code stored in the computer-readable medium/memory 1330, including circuitry 1321 for selecting, circuitry 1322 for transmitting, and circuitry 1323 for receiving.

Various components of communications device 1300 may provide means for performing the methods described herein, including with respect to FIGS. 9 and 10.

In some examples, means for transmitting or sending (or means for outputting for transmission) may include the transceivers 254 and/or antenna(s) 252 of the user equipment 104 illustrated in FIG. 2 and/or transceiver 1308 and antenna 1310 of the communication device 1300 in FIG. 13.

In some examples, means for receiving (or means for obtaining) may include the transceivers 254 and/or antenna(s) 252 of the user equipment 104 illustrated in FIG. 2 and/or transceiver 1308 and antenna 1310 of the communication device 1300 in FIG. 13.

In some examples, means for selecting, means for transmitting, and means for receiving may include various processing system components, such as: the one or more processors 1320 in FIG. 13, or aspects of the user equipment 104 depicted in FIG. 2, including receive processor 258, transmit processor 264, TX MIMO processor 266, and/or controller/processor 280 (including a sidelink configuration component 281).

Notably, FIG. 13 is just one example, and many other examples and configurations of communication device 1300 are possible.

Example Clauses

Implementation examples are described in the following numbered clauses:

Clause 1. A method for wireless communication by a user equipment (UE), comprising: selecting a first subband of multiple subbands of a bandwidth for communication on a sidelink channel, wherein each subband of the multiple subbands is associated with a configuration for the communication on the sidelink channel, the selection being based on the configuration associated with the first subband; and communicating on the sidelink channel using the first subband and in accordance with the configuration associated with the first subband.

Clause 2. The method of clause 1, wherein the configuration associated with each subband includes unicast, managed groupcast, connectionless groupcast, broadcast, or any combination thereof.

Clause 3. The method of any one of clauses 1-2, wherein the selection of the first subband is based on whether an application or service uses the configuration associated with the first subband.

Clause 4. The method of any one of clauses 1-3, wherein the configuration associated with each subband includes at least one resource allocation mode to be used for reserving resources for communication on the subband.

Clause 5. The method of clause 4, wherein each of the at least one resource allocation mode includes a configuration of whether resource reservation is to be carried out by sensing a medium for the communication on the subband.

Clause 6. The method of any one of clauses 4-5, wherein the at least one resource allocation mode comprises full sensing, partial sensing, or resource selection without sensing.

Clause 7. The method of any one of clauses 1-6, further comprising receiving, from each of one or more other UEs, an indication of a second subband of the multiple subbands on which the other UE is configured to communicate.

Clause 8. The method of clause 7, wherein the selection of the first subband is based on the indication of the second subband being sensed by the other UE.

Clause 9. The method of any one of clauses 7-8, wherein the first subband is the same as the second subband.

Clause 10. The method of any one of clauses 7-9, wherein the indication is received via sidelink control information (SCI) or medium access control (MAC) control element (CE).

Clause 11. The method of any one of clauses 1-10, wherein the communication using the first subband includes a communication of control information reserving resources for communication on one of the multiple subbands.

Clause 12. The method of any one of clauses 1-11, further comprising receiving, from a wireless node, an indication of the configuration associated with each of the multiple subbands.

Clause 13. The method of any one of clauses 1-12, wherein the bandwidth comprises a sidelink resource pool segmented into the multiple subbands.

Clause 14. A method for wireless communication by a wireless node, comprising: determining configurations associated with multiple subbands of a bandwidth for communication on a sidelink channel, wherein each of the configurations is associated with a respective one of the multiple subbands; and transmitting a message indicating the configurations to at least one user equipment (UE).

Clause 15. The method of clause 14, wherein each of the configurations include unicast, managed groupcast, connectionless groupcast, broadcast, or any combination thereof.

Clause 16. The method of any one of clauses 14-15, wherein each of the configurations includes at least one resource allocation mode to be used for reserving resources for communication on the respective one of the multiple subbands.

Clause 17. The method of clause 16, wherein each of the at least one resource allocation mode includes a configuration of whether resource reservation is to be carried out by sensing a medium for the communication on the respective one of the multiple subbands.

Clause 18. The method of any one of clauses 16-17, wherein the at least one resource allocation mode comprises full sensing, partial sensing, or resource selection without sensing.

Clause 19. The method of any one of clauses 16-18, wherein the bandwidth comprises a sidelink resource pool segmented into the multiple subbands.

Clause 20: An apparatus, comprising: a memory comprising executable instructions; one or more processors configured to execute the executable instructions and cause the apparatus to perform a method in accordance with any one of Clauses 1-19.

Clause 21: An apparatus, comprising means for performing a method in accordance with any one of Clauses 1-19.

Clause 22: A non-transitory computer-readable medium comprising executable instructions that, when executed by one or more processors of an apparatus, cause the apparatus to perform a method in accordance with any one of Clauses 1-19.

Clause 23: A computer program product embodied on a computer-readable storage medium comprising code for performing a method in accordance with any one of Clauses 1-19.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used.

In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single-carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of sequence selection for communication on a sidelink channel in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16

(WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication by a user equipment (UE), comprising:
   memory; and
   one or more processors coupled to the memory, the one or more processors being configured to:
      select a first subband of multiple subbands of a bandwidth for communication on a sidelink channel, wherein the multiple subbands include a second subband and each subband of the multiple subbands is associated with a respective configuration for the communication on the sidelink channel, the selection being based on an application or service using the respective configuration associated with the first subband, wherein the first subband is dedicated to broadcast and connectionless groupcast and the second subband is dedicated to unicast and managed groupcast; and
      communicate on the sidelink channel using the first subband in accordance with the respective configuration.

2. The apparatus of claim 1, wherein the configurations associated with the multiple subbands include different types of resource allocation sensing modes, and wherein the different types of resource allocation sensing modes are used for reserving resources for communication on a respective one of the multiple subbands.

3. The apparatus of claim 1, wherein the configuration associated with the first subband includes whether resource reservation is to be carried out by sensing a medium for the communication on the subband.

4. The apparatus of claim 1, wherein the configurations associated with the multiple subbands include different types of resource allocation sensing modes including full sensing and partial sensing, and wherein the full sensing is associated with sensing a configured resource pool for resource allocation and the partial sensing is associated with sensing a portion of the configured resource pool for resource allocation.

5. The apparatus of claim 1, wherein the one or more processors are configured to receive, from each of one or more other UEs, an indication of at least one of the multiple subbands on which the other UE is configured to communicate.

6. The apparatus of claim 5, wherein the selection of the first subband is based on the indication of the at least one of the multiple subbands being sensed by the other UE.

7. The apparatus of claim 5, wherein the at least one of the multiple subbands includes the first subband.

8. The apparatus of claim 5, wherein the indication is received via sidelink control information (SCI) or medium access control (MAC) control element (CE).

9. The apparatus of claim 1, wherein the communication using the first subband includes a communication of control information reserving resources for communication on one of the multiple subbands.

10. The apparatus of claim 1, wherein the one or more processors are configured to receive, from a wireless node, an indication of the configuration associated with each of the multiple subbands.

11. The apparatus of claim 1, wherein the multiple subbands include different subbands dedicated to full sensing and partial sensing, respectively.

12. An apparatus for wireless communication by a wireless node, comprising:
   memory; and
   one or more processors coupled to the memory, the one or more processors being configured to:
      determine configurations associated with multiple subbands of a bandwidth for communication on a sidelink channel, wherein each of the configurations is associated with a respective one of the multiple subbands, wherein the multiple subbands include a first subband dedicated to broadcast and connectionless groupcast and a second subband dedicated to unicast and managed groupcast;
      transmit a message indicating the configurations to at least one user equipment (UE); and
      communicate on the sidelink channel using the first subband in accordance with the respective configuration and based on an application or service using the respective configuration associated with the first subband.

13. The apparatus of claim 12, wherein the configurations associated with the multiple subbands include different types of resource allocation sensing modes, and wherein the different types of resource allocation sensing modes are used for reserving resources for communication on a respective one of the multiple subbands.

14. The apparatus of claim 12, wherein the configuration associated with the first subband or the second subband includes whether resource reservation is to be carried out by sensing a medium for the communication on a respective one of the multiple subbands.

15. The apparatus of claim 12, wherein the configurations associated with the multiple subbands include different types of resource allocation sensing modes including full sensing and partial sensing, and wherein the full sensing is associated with sensing a configured resource pool for resource allocation and the partial sensing is associated with sensing a portion of the configured resource pool for resource allocation.

16. The apparatus of claim 12, wherein the multiple subbands include different subbands dedicated to full sensing and partial sensing, respectively.

17. A method for wireless communication by a user equipment (UE), comprising:

selecting a first subband of multiple subbands of a bandwidth for communication on a sidelink channel, wherein the multiple subbands include a second subband and each subband of the multiple subbands is associated with a respective configuration for the communication on the sidelink channel, the selection being based on an application or service using the respective configuration associated with the first subband, wherein the first subband is dedicated to broadcast and connectionless groupcast and the second subband is dedicated to unicast and managed groupcast; and communicating on the sidelink channel using the first subband in accordance with the respective configuration.

18. The method of claim 17, wherein the configurations associated with the multiple subbands include different types of resource allocation sensing modes, and wherein the different types of resource allocation sensing modes are used for reserving resources for communication on the subband.

19. The method of claim 18, wherein the configuration associated with the first subband includes whether resource reservation is to be carried out by sensing a medium for the communication on the subband.

20. The method of claim 18, wherein the configurations associated with the multiple subbands include different types of resource allocation sensing modes including full sensing and partial sensing, and wherein the full sensing is associated with sensing a configured resource pool for resource allocation and the partial sensing is associated with sensing a portion of the configured resource pool for resource allocation.

21. The method of claim 17, further comprising receiving, from each of one or more other UEs, an indication of at least one of the multiple subbands on which the other UE is configured to communicate.

22. The method of claim 21, wherein the first subband is selected based on the indication of the at least one of the multiple subbands being sensed by the other UE.

23. The method of claim 21, wherein the at least one of the multiple subband includes the first subband.

24. The method of claim 21, wherein the indication is received via sidelink control information (SCI) or medium access control (MAC) control element (CE).

25. A method for wireless communication by a wireless node, comprising:

determining configurations associated with multiple subbands of a bandwidth for communication on a sidelink channel, wherein each of the configurations is associated with a respective one of the multiple subbands, wherein the multiple subbands include a first subband dedicated to broadcast and connectionless groupcast and a second subband dedicated to unicast and managed groupcast;

transmitting a message indicating the configurations to at least one user equipment (UE); and communicate on the sidelink channel using the first subband in accordance with the respective configuration and based on an application or service using the respective configuration associated with the first subband.

* * * * *